United States Patent
Zhao et al.

(10) Patent No.: US 9,462,565 B2
(45) Date of Patent: Oct. 4, 2016

(54) EVOLUTION-DATA OPTIMIZED (EVDO) SESSION HANDLING DURING MOBILITY WITH SUPPORT FOR S101 SIGNALING INTERFACE

(71) Applicant: QUALCOMM Incorporated, San Diego, CA (US)

(72) Inventors: Suli Zhao, San Diego, CA (US); Shian-De Ju, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 287 days.

(21) Appl. No.: 13/633,299

(22) Filed: Oct. 2, 2012

(65) Prior Publication Data

US 2013/0084861 A1 Apr. 4, 2013

Related U.S. Application Data

(60) Provisional application No. 61/542,771, filed on Oct. 3, 2011.

(51) Int. Cl.
*H04W 4/00* (2009.01)
*H04W 60/00* (2009.01)
*H04W 36/14* (2009.01)

(52) U.S. Cl.
CPC ............ *H04W 60/005* (2013.01); *H04W 36/14* (2013.01)

(58) Field of Classification Search
CPC ............ H04W 36/14; H04W 36/0016; H04W 36/0033; H04W 36/0072; H04W 60/005
USPC ................ 455/432.1–444; 370/331–333
See application file for complete search history.

(56) References Cited

U.S. PATENT DOCUMENTS

| | | | |
|---|---|---|---|
| 2006/0187879 A1 | 8/2006 | Motegi et al. | |
| 2008/0259876 A1 | 10/2008 | Qiang et al. | |
| 2010/0075680 A1 | 3/2010 | Ramachandran et al. | |
| 2010/0150112 A1* | 6/2010 | Lee et al. | 370/332 |
| 2010/0268981 A1 | 10/2010 | Xiang | |
| 2010/0284370 A1* | 11/2010 | Samar et al. | 370/331 |
| 2012/0172036 A1* | 7/2012 | Bhalla | 455/432.1 |
| 2012/0257597 A1* | 10/2012 | Zhang et al. | 370/331 |
| 2013/0336157 A1* | 12/2013 | Tidestav | 370/252 |
| 2015/0296472 A1* | 10/2015 | Ramachandran | H04W 60/00 370/331 |

OTHER PUBLICATIONS

Buvaneswari A., et al., "Self-Optimization of LTE Networks Utilizing Celnet Xplorer," Bell Labs Technical Journal 2010-15(3) ,pp. 99-118, May 2010.

* cited by examiner

*Primary Examiner* — Allahyar Kasraian
(74) *Attorney, Agent, or Firm* — Patterson & Sheridan, L.L.P.

(57) ABSTRACT

Certain aspects of the present disclosure propose techniques for Evolution-Data Optimized (EVDO) session handling during inter radio access technology (IRAT) mobility with support for S101 signaling interface. A UE may determine a mobility scenario for transfer of the UE among a first cell and a second cell, while the UE has an EVDO session. The UE may further determine whether pre-registration of a UE EVDO session is allowed via an S101 signaling interface. The UE may perform a procedure related to the EVDO session based on the determined mobility scenario and whether the pre-registration is allowed or not.

12 Claims, 10 Drawing Sheets

| Index | Source cell | Target cell | Idle mobility scenario | UE behavior |
|---|---|---|---|---|
| 1 | LTE (preRegistrationAllowed = T) | LTE (preRegistrationAllowed = T) | Cell reselection/redirection | If UATIColorCode is different from ColorCode and SecondaryColorCode list (if available), the UE shall perform UATI procedure. Otherwise, retain the current session. |
| 2 | LTE (preRegistrationAllowed = F) | LTE (preRegistrationAllowed = T) | Cell reselection/redirection/ OOS (If LTE OOS, HRPD stack shall set preRegistrationAllowed = F) | The UE shall try to restore DO session |
| 3 | Same LTE cell (preRegistrationAllowed = F in SIB8) | LTE (preRegistrationAllowed = T in SIB8) | Transition to RRC_CONNECTED (preRegistrationAllowed = T in RRCConnectionReconfiguration) | |
| 4 | Any | LTE (preRegistrationAllowed = F) | Any | The UE does nothing |

FIG. 6A

| Index | Source cell | Target cell | Idle mobility scenario | UE behavior |
|---|---|---|---|---|
| 1 | eHRPD | LTE (preRegistrationAllowed = T) | Cell reselection/redirection/BSR/OOS | If nonzero subtype of SAP exists in the active personality, the UE shall try to restore session. Otherwise, clean current session, recreate session with IRAT subtypes, and perform pre-registration. |
| 2 | eHRPD | LTE (preRegistrationAllowed = T) | Cell reselection AND the target cell is the one that the UE successfully reselects from eHRPD. | If nonzero subtype of SAP exists in the active personality, the UE performs UATI procedure. Otherwise, clean current session, recreate session with IRAT subtypes, and perform pre-registration. |

FIG. 6B

| Index | Source RAT | Target RAT | Idle mobility scenario | UE behavior |
|---|---|---|---|---|
| 1 | LTE (preRegistrationAllowed = T) | eHRPD | Cell reselection/redirection | If subnet change is detected and the UATIColorCode is different from the SecondaryColorCode list (if available), the UE shall perform UATI procedure. Otherwise, retain the current session. |
| 2 | LTE (preRegistrationAllowed = F) | eHRPD | Cell reselection/redirection/ OOS (HRPD stack shall set preRegistrationAllowed = F if LTE OOS) | If subnet change is detected, the UE shall try to restore DO session. Otherwise, retain the current session. |
| 3 | Any non-eHRPD RAT (tunnel mode is not enabled) | eHRPD | Any | If subnet change is detected, the UE shall try to restore DO session [S15]. Otherwise, retain the current session. |

FIG. 7

EVOLUTION-DATA OPTIMIZED (EVDO) SESSION HANDLING DURING MOBILITY WITH SUPPORT FOR S101 SIGNALING INTERFACE

CLAIM OF PRIORITY UNDER 35 U.S.C. §119

The present application for patent claims priority to U.S. Provisional Application No. 61/542,771, entitled "Evolution-Data Optimized (EVDO) Session Handling during Mobility with Support for S101 Signaling Interface," filed Oct. 3, 2011, and assigned to the assignee hereof and hereby expressly incorporated by reference herein.

BACKGROUND

1. Field

Certain aspects of the present disclosure generally relate to wireless communications and, more particularly, to methods and apparatus for Evolution-Data Optimized (EVDO) session handling during mobility (e.g., inter radio access technology (IRAT) mobility) with support for S101 signaling interface.

2. Background

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. The forward communication link and the reverse communication link may be established via a single-input single-output, multiple-input single-output or a multiple-input multiple-output system.

A wireless multiple-access communication system can support a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

The 3GPP LTE represents a major advance in cellular technology and it is a next step forward in cellular $3^{rd}$ generation (3G) services as a natural evolution of Global System for Mobile Communications (GSM) and Universal Mobile Telecommunications System (UMTS). The LTE provides for an uplink speed of up to 75 megabits per second (Mbps) and a downlink speed of up to 300 Mbps, and brings many technical benefits to cellular networks. The LTE is designed to meet carrier needs for high-speed data and media transport as well as high-capacity voice support. The bandwidth may be scalable from 1.25 MHz to 20 MHz. This suits the requirements of different network operators that have different bandwidth allocations, and also allows operators to provide different services based on spectrum. The LTE is also expected to improve spectral efficiency in 3G networks, allowing carriers to provide more data and voice services over a given bandwidth.

Physical layer (PHY) of the LTE standard is a highly efficient means of conveying both data and control information between an enhanced base station (eNodeB) and mobile user equipment (UE). The LTE PHY employs advanced technologies that are new to cellular applications. These include Orthogonal Frequency Division Multiplexing (OFDM) and Multiple Input Multiple Output (MIMO) data transmission. In addition, the LTE PHY uses OFDMA on the downlink and Single Carrier—Frequency Division Multiple Access (SC-FDMA) on the uplink. OFDMA allows data to be directed to or from multiple users on a subcarrier-by-subcarrier basis for a specified number of symbol periods.

SUMMARY

Certain aspects of the present disclosure provide a method for wireless communications. The method generally includes while a user equipment (UE) has an Evolution-Data Optimized (EVDO) session, determining a mobility scenario for transfer of the UE among a first cell and a second cell; determining whether pre-registration of a UE EVDO session via an S101 interface is allowed; and performing a procedure related to the EVDO session based on the determined mobility scenario and whether the pre-registration is allowed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 6A illustrates a table showing example EVDO session handling when moving to or within E-UTRAN, in accordance with certain aspects of the present disclosure.

FIG. 6B illustrates a table 600B that shows EVDO session handling when moving from eHRPD to LTE with pre-registration allowed, in accordance with certain aspects of the present disclosure.

FIG. 7 illustrates a table showing example EVDO session handling during E-UTRAN to eHRPD mobility, in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. CDMA2000 covers IS-2000, IS-95, and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Example Wireless Network

Figure 1:
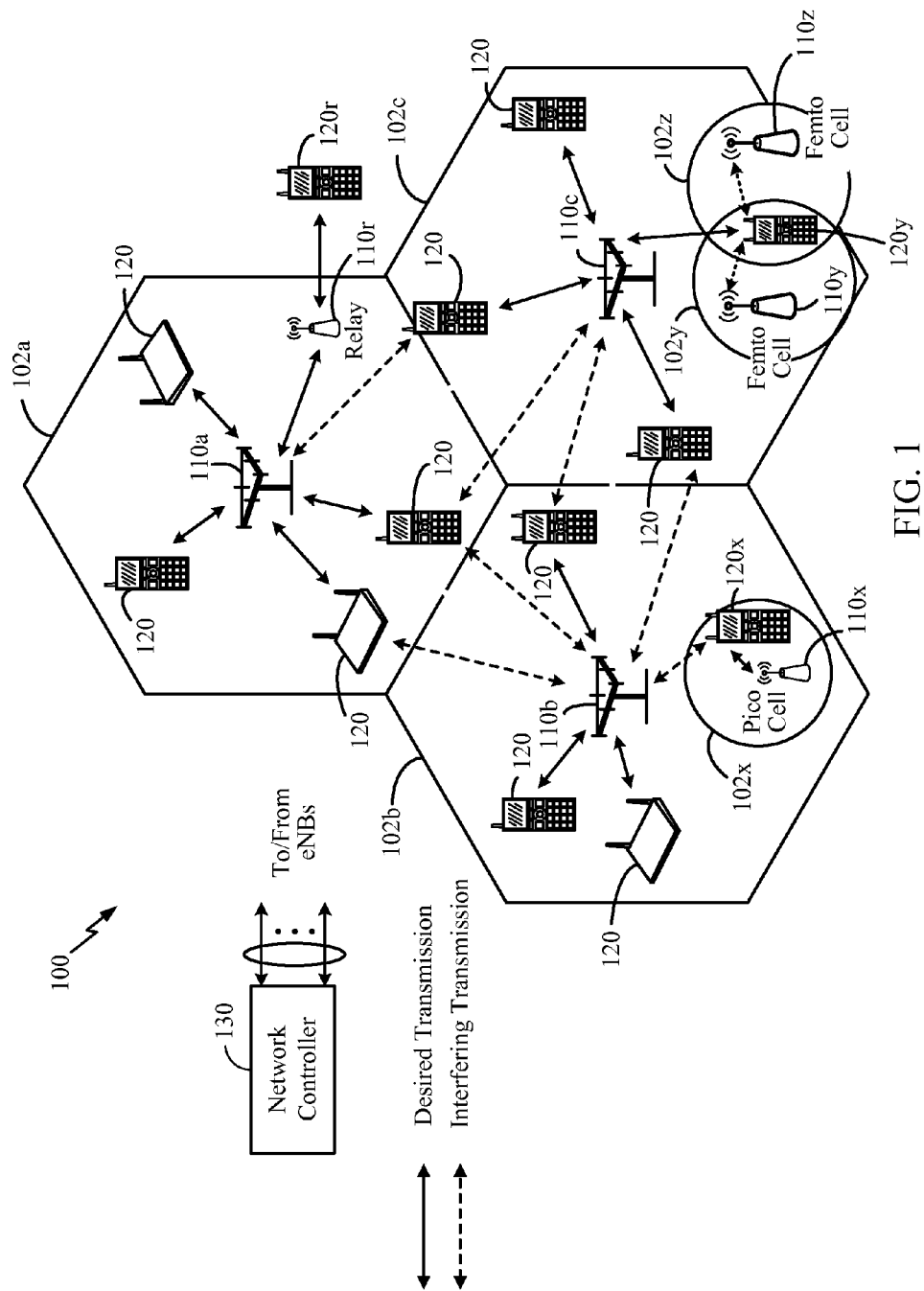
FIG. 1 is a block diagram conceptually illustrating an example of a wireless communications network in accordance with certain aspects of the present disclosure.

FIG. 1 shows a wireless communication network 100, which may be an LTE network. The wireless network 100 may include a number of evolved Node Bs (eNBs) 110 and other network entities. An eNB may be a station that communicates with user equipment devices (UEs) and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB (e.g., a macro base station). An eNB for a pico cell may be referred to as a pico eNB (e.g., a pico base station). An eNB for a femto cell may be referred to as a femto eNB (e.g., a femto base station) or a home eNB. In the example shown in FIG. 1, eNBs 110a, 110b, and 110c may be macro eNBs for macro cells 102a, 102b, and 102c, respectively. eNB 110x may be a pico eNB for a pico cell 102x. eNBs 110y and 110z may be femto eNBs for femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with eNB 110a and a UE 120r in order to facilitate communication between eNB 110a and UE 120r. A relay station may also be referred to as a relay eNB, a relay, etc.

The wireless network 100 may be a heterogeneous network (HetNet) that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 watts) whereas pico eNBs, femto eNBs, and relays may have a lower transmit power level (e.g., 1 watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with eNBs 110 via a backhaul. The eNBs 110 may also communicate with one another, e.g., directly or indirectly via wireless or wireline backhaul.

The UEs 120 may be dispersed throughout the wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a tablet, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB. For certain aspects, the UE may comprise an LTE Release 10 UE.

LTE utilizes orthogonal frequency division multiplexing (OFDM) on the downlink and single-carrier frequency division multiplexing (SC-FDM) on the uplink. OFDM and SC-FDM partition the system bandwidth into multiple (K)

orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz, and there may be 1, 2, 4, 8, or 16 subbands for system bandwidth of 1.25, 2.5, 5, 10, or 20 MHz, respectively.

Figure 2:
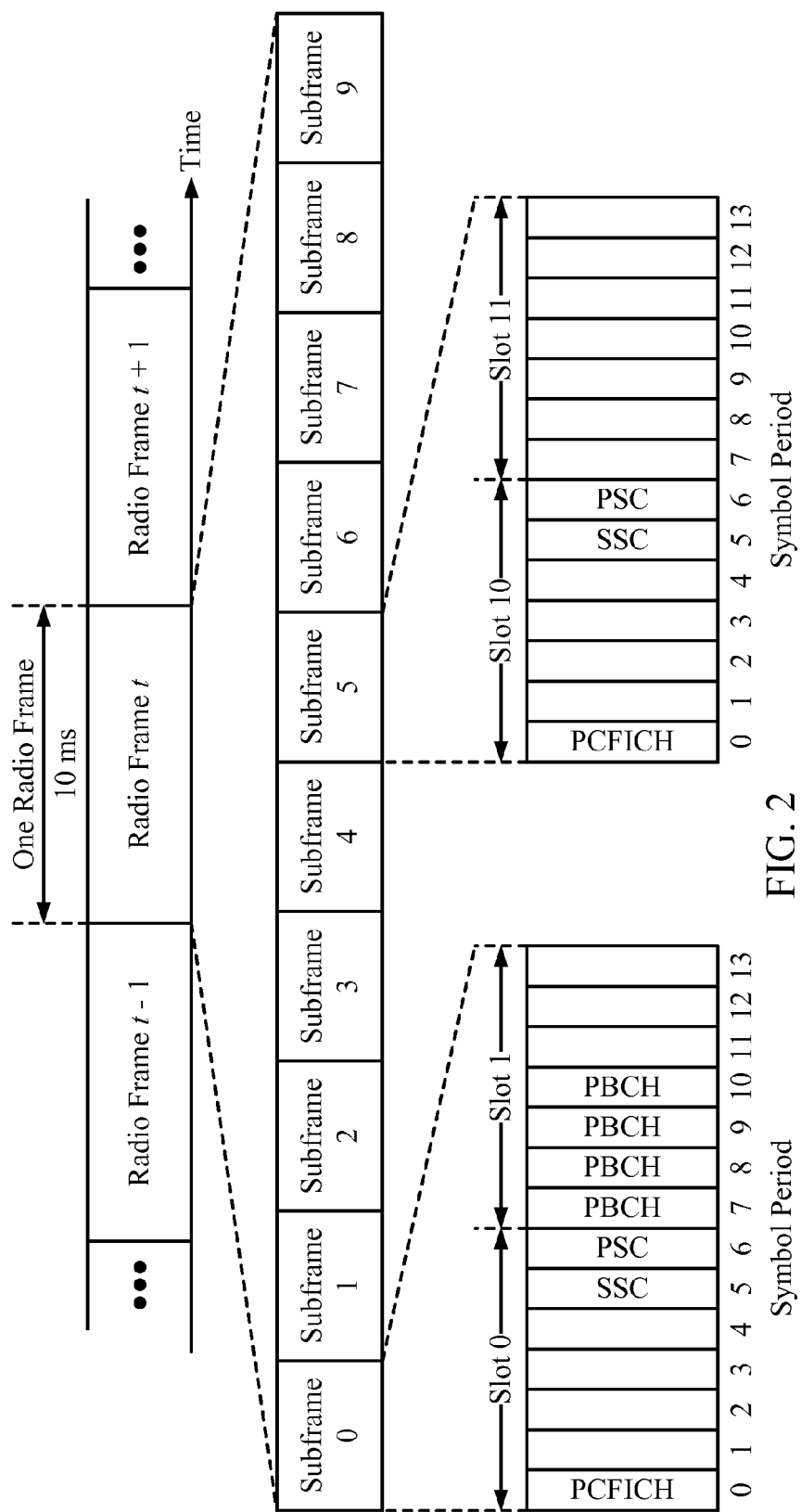
FIG. 2 is a block diagram conceptually illustrating an example of a frame structure in a wireless communications network in accordance with certain aspects of the present disclosure.

FIG. 2 shows a frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., L=7 symbol periods for a normal cyclic prefix (as shown in FIG. 2) or L=6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as shown in FIG. 2. The PCFICH may convey the number of symbol periods (M) used for control channels, where M may be equal to 1, 2, or 3 and may change from subframe to subframe. M may also be equal to 4 for a small system bandwidth, e.g., with less than 10 resource blocks. The eNB may send a Physical HARQ Indicator Channel (PHICH) and a Physical Downlink Control Channel (PDCCH) in the first M symbol periods of each subframe (not shown in FIG. 2). The PHICH may carry information to support hybrid automatic repeat request (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNB may send the PSS, SSS, and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH, and PHICH in a broadcast manner to all UEs, may send the PDCCH in a unicast manner to specific UEs and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1, and 2. The PDCCH may occupy 9, 18, 36, or 72 REGs, which may be selected from the available REGs, in the first M symbol periods, for example. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

Figure 2A:
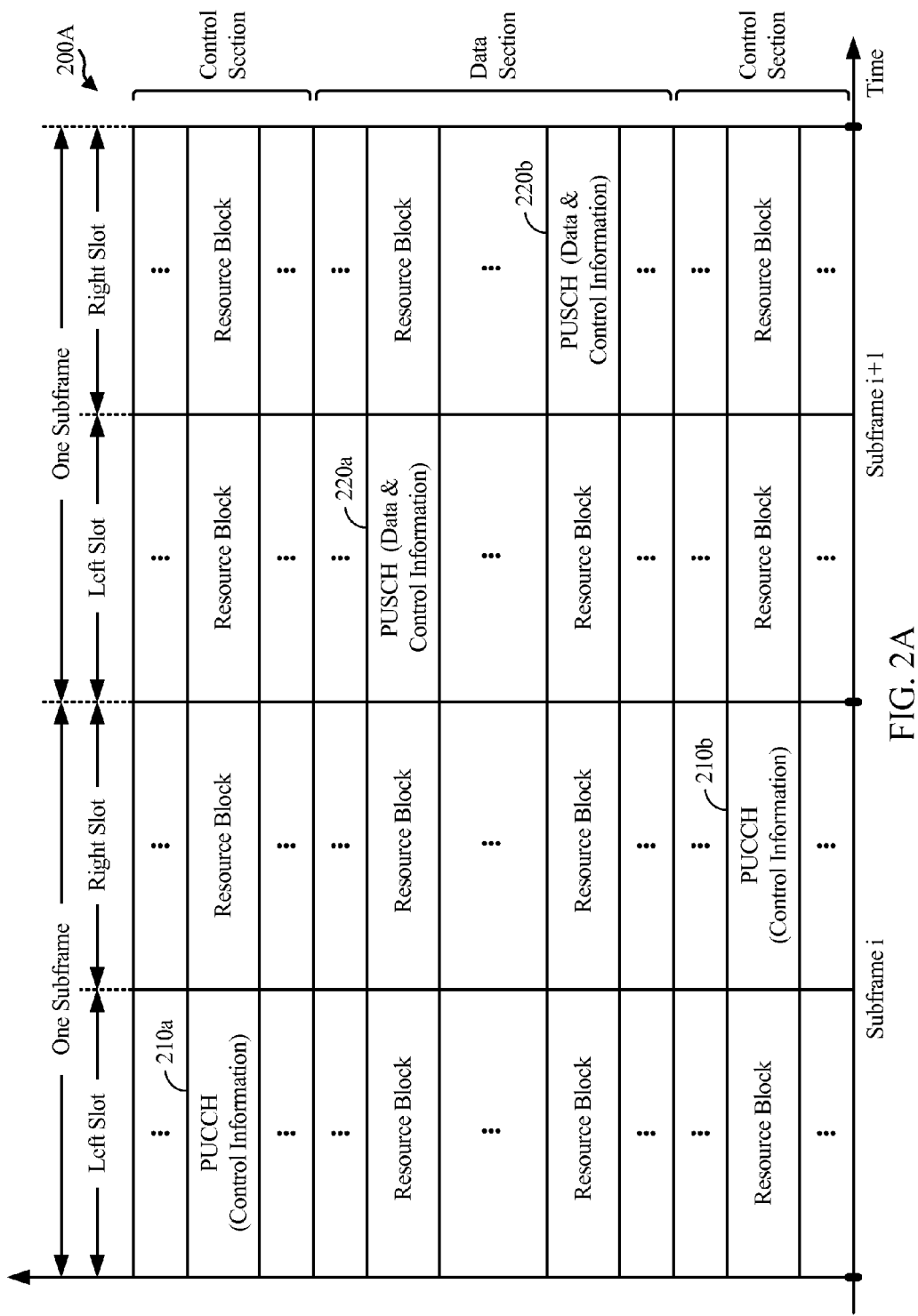
FIG. 2A shows an example format for the uplink in Long Term Evolution (LTE) in accordance with certain aspects of the present disclosure.

FIG. 2A shows an exemplary format 200A for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 2A results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNB. The UE may transmit control information in a Physical Uplink Control Channel (PUCCH) 210a, 210b on the assigned resource blocks in the control section. The UE may transmit only data or both data and control information in a Physical Uplink Shared Channel (PUSCH) 220a, 220b on the assigned resource blocks in the data section. An uplink transmission may span both slots of a subframe and may hop across frequency as shown in FIG. 2A.

A UE may be within the coverage of multiple eNBs. One of these eNBs may be selected to serve the UE. The serving eNB may be selected based on various criteria such as received power, pathloss, signal-to-noise ratio (SNR), etc.

A UE may operate in a dominant interference scenario in which the UE may observe high interference from one or more interfering eNBs. A dominant interference scenario may occur due to restricted association. For example, in FIG. 1, UE 120y may be close to femto eNB 110y and may have high received power for eNB 110y. However, UE 120y may not be able to access femto eNB 110y due to restricted association and may then connect to macro eNB 110c with lower received power (as shown in FIG. 1) or to femto eNB 110z also with lower received power (not shown in FIG. 1).

UE 120y may then observe high interference from femto eNB 110y on the downlink and may also cause high interference to eNB 110y on the uplink.

A dominant interference scenario may also occur due to range extension, which is a scenario in which a UE connects to an eNB with lower pathloss and lower SNR among all eNBs detected by the UE. For example, in FIG. 1, UE 120x may detect macro eNB 110b and pico eNB 110x and may have lower received power for eNB 110x than eNB 110b. Nevertheless, it may be desirable for UE 120x to connect to pico eNB 110x if the pathloss for eNB 110x is lower than the pathloss for macro eNB 110b. This may result in less interference to the wireless network for a given data rate for UE 120x.

In an aspect, communication in a dominant interference scenario may be supported by having different eNBs operate on different frequency bands. A frequency band is a range of frequencies that may be used for communication and may be given by (i) a center frequency and a bandwidth or (ii) a lower frequency and an upper frequency. A frequency band may also be referred to as a band, a frequency channel, etc. The frequency bands for different eNBs may be selected such that a UE can communicate with a weaker eNB in a dominant interference scenario while allowing a strong eNB to communicate with its UEs. An eNB may be classified as a "weak" eNB or a "strong" eNB based on the received power of signals from the eNB received at a UE (and not based on the transmit power level of the eNB).

According to certain aspects of the present disclosure, when a network supports enhanced inter-cell interference coordination (eICIC), the base stations may negotiate with each other to coordinate resources in order to reduce or eliminate interference by the interfering cell giving up part of its resources. In accordance with this interference coordination, a UE may be able to access a serving cell even with severe interference by using resources yielded by the interfering cell.

For example, a femto cell with a closed access mode (e.g., in which only a member femto UE can access the cell) in the coverage area of an open macro cell may be able to create a "coverage hole" (in the femto cell's coverage area) for a macro cell by yielding resources and effectively removing interference. By negotiating for a femto cell to yield resources, the macro UE under the femto cell coverage area may still be able to access the UE's serving macro cell using these yielded resources.

In a radio access system using OFDM, such as Evolved Universal Terrestrial Radio Access Network (E-UTRAN), the yielded resources may be time based, frequency based, or a combination of both. When the coordinated resource partitioning is time based, the interfering cell may simply not use some of the subframes in the time domain. When the coordinated resource partitioning is frequency based, the interfering cell may yield subcarriers in the frequency domain. With a combination of both frequency and time, the interfering cell may yield frequency and time resources.

Figure 3:
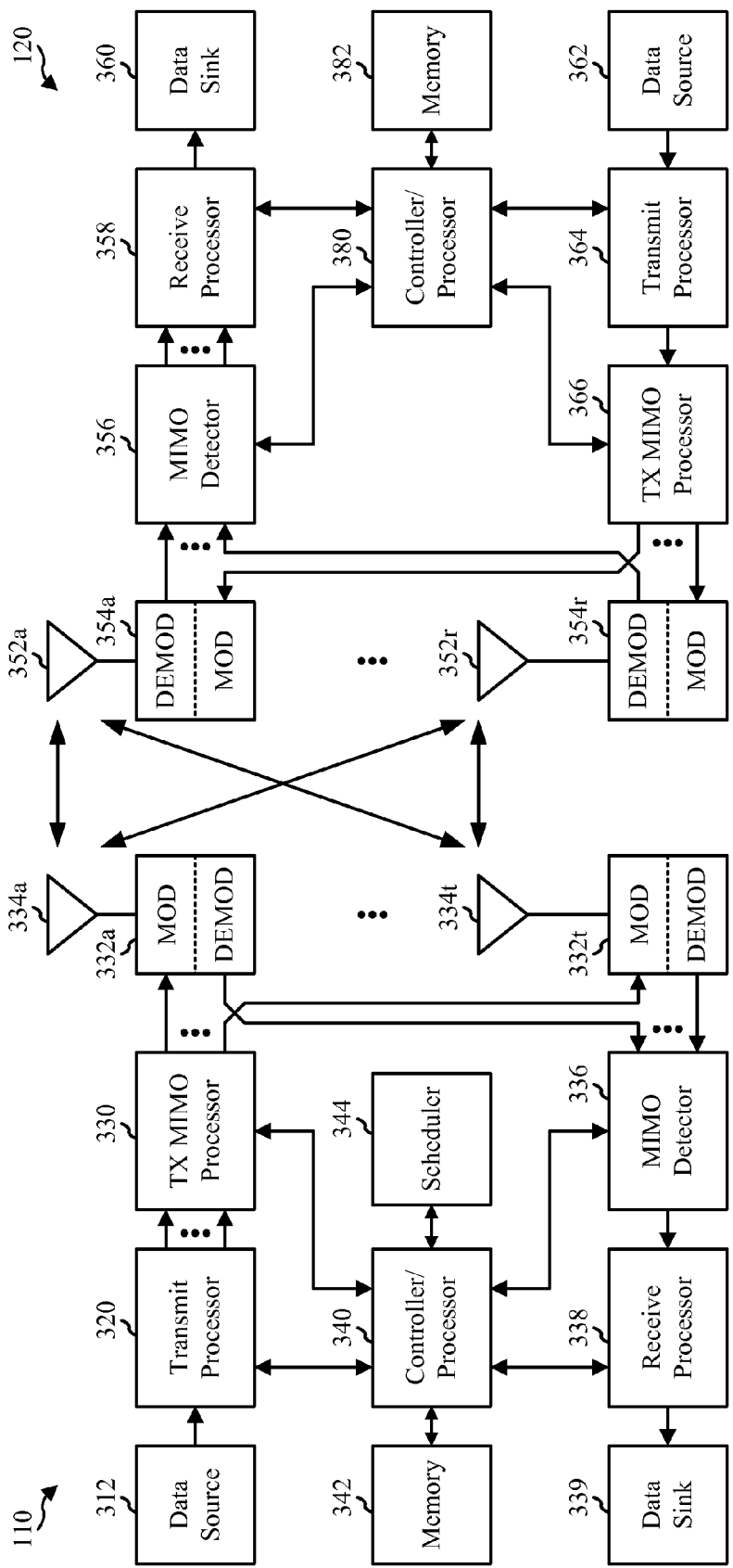
FIG. 3 shows a block diagram conceptually illustrating an example of a eNode B in communication with a user equipment device (UE) in a wireless communications network in accordance with certain aspects of the present disclosure.

FIG. 3 is a block diagram of a design of a base station or an eNB 110 and a UE 120, which may be one of the base stations/eNBs and one of the UEs in FIG. 1. For a restricted association scenario, the eNB 110 may be macro eNB 110c in FIG. 1, and the UE 120 may be UE 120y. The eNB 110 may also be a base station of some other type. The eNB 110 may be equipped with T antennas 334a through 334t, and the UE 120 may be equipped with R antennas 352a through 352r, where in general T≥1 and R≥1.

At the eNB 110, a transmit processor 320 may receive data from a data source 312 and control information from a controller/processor 340. The control information may be for the PBCH, PCFICH, PHICH, PDCCH, etc. The data may be for the PDSCH, etc. The transmit processor 320 may process (e.g., encode and symbol map) the data and control information to obtain data symbols and control symbols, respectively. The transmit processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide T output symbol streams to T modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. T downlink signals from modulators 332a through 332t may be transmitted via T antennas 334a through 334t, respectively.

At the UE 120, antennas 352a through 352r may receive the downlink signals from the eNB 110 and may provide received signals to demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all R demodulators 354a through 354r, perform MIMO detection on the received symbols, if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The transmit processor 364 may also generate reference symbols for a reference signal. The symbols from transmit processor 364 may be preceded by a TX MIMO processor 366 if applicable, further processed by modulators 354a through 354r (e.g., for SC-FDM, etc.), and transmitted to the eNB 110. At the eNB 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The receive processor 338 may provide the decoded data to a data sink 339 and the decoded control information to the controller/processor 340.

The controllers/processors 340 and 380 may direct the operation at the eNB 110 and the UE 120, respectively. The controller/processor 340, receive processor 338, and/or other processors 320, 330, 358, 380, 366, 364 and modules at the eNB 110 and/or the UE 120 may perform or direct operations and/or processes for the techniques described herein. The memories 342 and 382 may store data and program codes for the eNB 110 and the UE 120, respectively. A scheduler 344 may schedule UEs for data transmission on the downlink and/or uplink.

Figure 4:
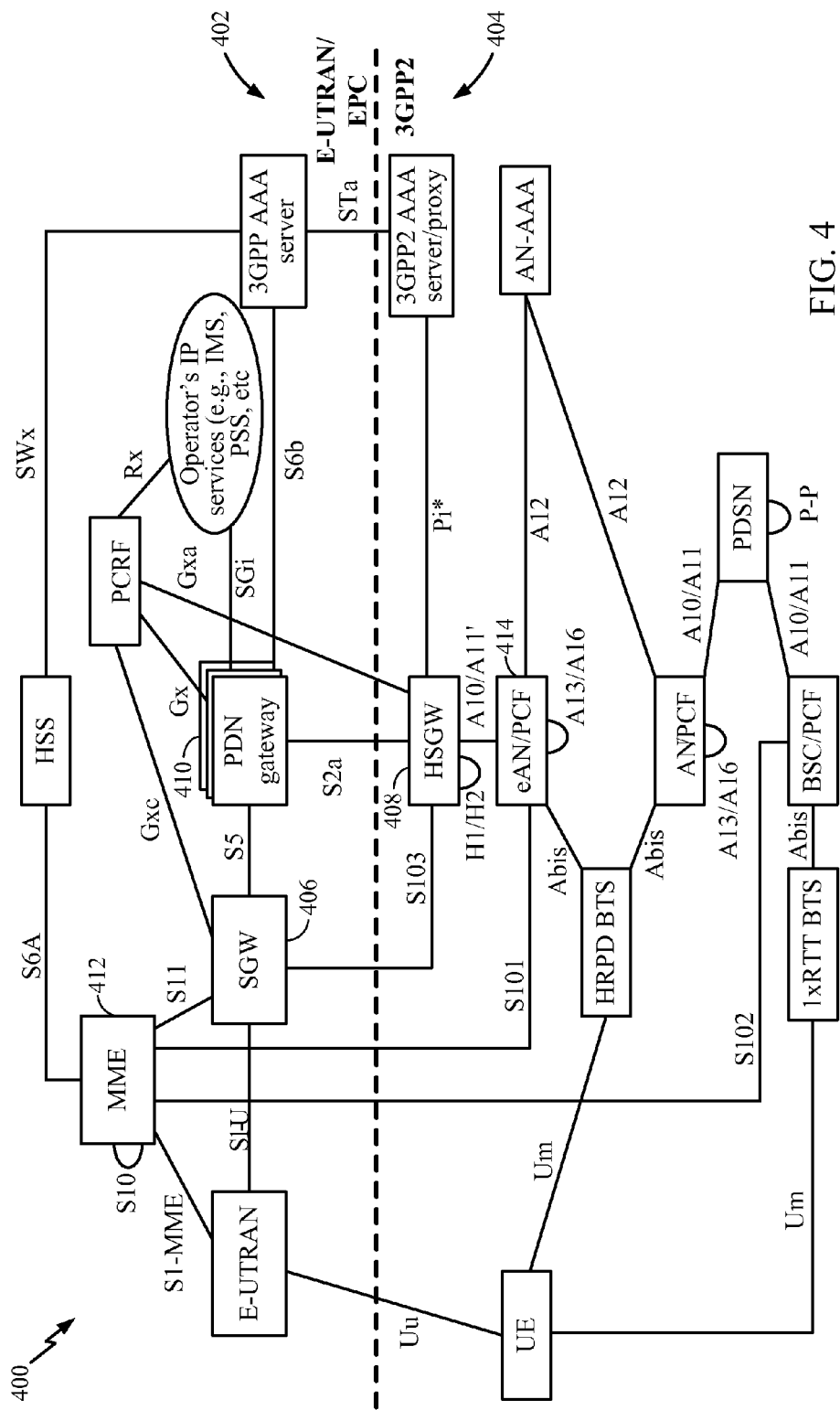
FIG. 4 illustrates example network architecture for a handover of a UE between Long Term Evolution (LTE) and evolved High Rate Packet Data (eHRPD) with S101 support, in accordance with certain aspects of the present disclosure.

Example Techniques for EVDO Session Handling During IRAT Mobility with Support for S101 Signaling Interface FIG. 4 illustrates example network architecture 400, in which handover of a UE between Long Term Evolution (LTE) and evolved High Rate Packet Data (eHRPD) with S101 support may be performed, in accordance with certain aspects of the present disclosure.

Reference numeral 402 is a 3GPP LTE (Long Term Evolution)/E-UTRAN (Evolved Universal Terrestrial Radio Access) portion of the network 400 and reference numeral 404 is a 3GPP2 (3$^{rd}$ Generation Partnership Project 2) portion of the network 400. EHRPD (Evolved High Rate Packet Data) and HRPD (High Rate Packet Data) are considered 3gpp2 Evolution-Data Optimized (EVDO) Radio Access Technologies (RATs). In certain aspects, when a device, such as a UE, moves from one RAT to another, it may be possible to maintain IP continuity if the two RATs are connected to the same core network. For example, a UE moving between EVDO and 1x may maintain continuity. Moving between RATs connected to the same core network may be transparent to the applications, as the device may have the same IP address on the new RAT.

In certain aspects, for a UE moving between LTE and EHRPD, IP continuity may be maintained for data calls since both LTE and EHRPD radio access technologies (RATs) are connected to the same 3gpp (Evolved Packet Core (EPC)) core network. The serving gateway (SGW) 406 for LTE and HRPD serving gateway (HSGW) 408 for EHRPD may assign an IP address to the device after getting it from the PDN gateway 410. All three entities, SGW 406, HSGW 408, and PDN 410, may be considered part of EPC core network.

S101 is a signaling interface between the EPC Mobility Management Entity (MME) 412 and the eHRPD Access Network (eAN) 414, which may allow the UE to perform eHRPD pre-registration and create contexts (e.g. radio session and data session including Point-to-Point (PPP)/Internet Protocol (IP)/Quality of Service (QoS) context) for eHRPD over tunneling while operating in the LTE radio interface. With S101 supported, when the UE moves to eHRPD from LTE, the UE can save signaling/time for setting up the context before starting/continuing data transfer over eHRPD.

Figure 5:
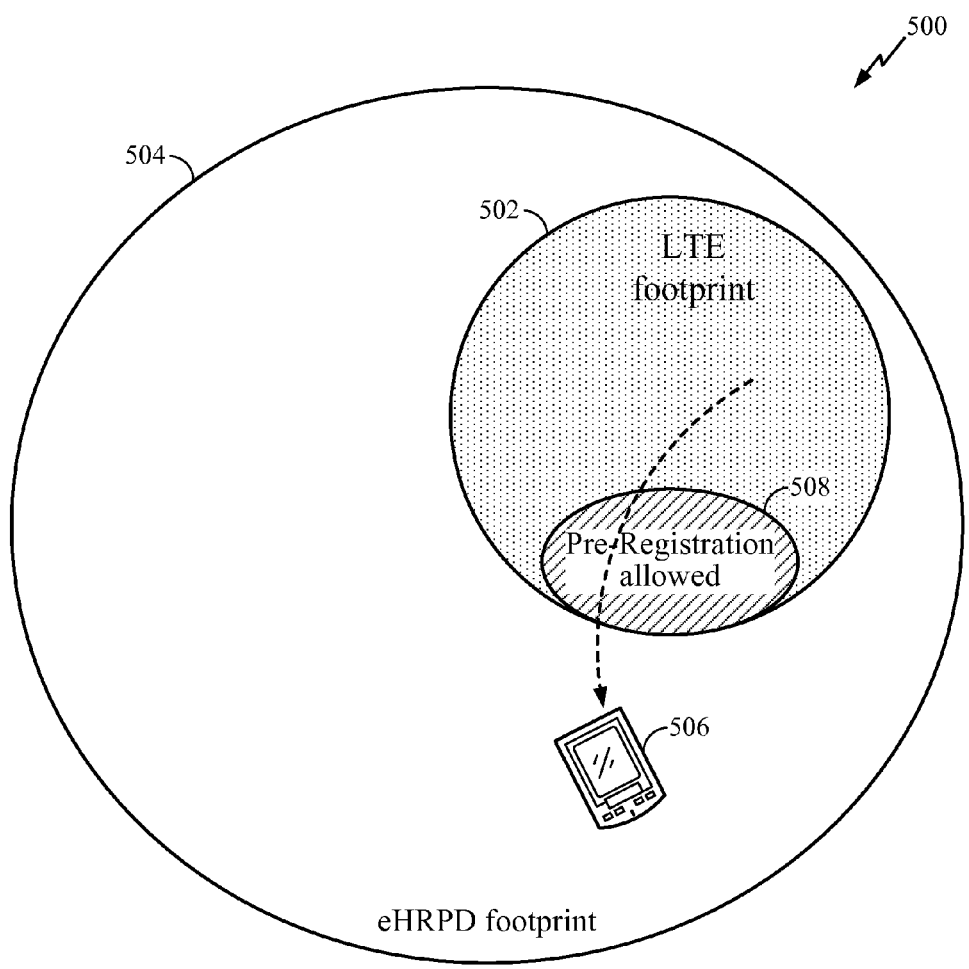
FIG. 5 illustrates example eHRPD pre-registration in an LTE cell that allows eHRPD pre-registration for a UE, in accordance with certain aspects of the present disclosure.

FIG. 5 illustrates example eHRPD pre-registration in an LTE cell that allows eHRPD pre-registration for a UE in accordance with certain aspects of the present disclosure. Reference numeral 502 represents an LTE footprint and reference numeral 504 represents an eHRPD footprint. As shown, UE 506 may perform eHRPD pre-registration in an LTE cell (or zone thereof) that allows pre-registration. In an aspect, the pre-registration typically includes creating and maintaining an eHRPD session over S101 tunnel interface and creating and maintaining PPP/IP/QoS contexts over eHRPD. Thus, the UE typically has all the required contexts for eHRPD when an actual handoff to the eHRPD occurs.

In certain aspects, not all the LTE cells allow the UE to perform pre-registration. Normally an operator will enable the UE to perform pre-registration at the boundary of the LTE coverage (e.g., boundary of the LTE footprint as shown) to reduce unnecessary eHRPD signaling for maintaining the context. Therefore, when S101 is deployed in the network, only part of the LTE coverage may allow the UE to perform pre-registration. As a result, even when S101 is supported by the network, new mobility scenarios may arise when the UE moves among eHRPD and/or LTE regions that allow pre-registration and/or LTE regions that do not allow pre-registration.

For example, such scenarios may include when a UE moves from eHRPD cell to LTE cell that allows pre-registration, when a UE moves from LTE cell that allows pre-registration to an eHRPD cell, and/or when a UE moves from LTE cell that does not allow pre-registration to an eHRPD cell.

Another set of mobility scenarios arise when the UE is moving within LTE coverage. For example, such scenarios may include handoff (e.g., idle handoff) from one LTE cell that allows pre-registration to another that allows pre-registration (same pre-registration zone), handoff from one LTE cell that allows pre-registration to another that allows pre-registration (different pre-registration zone), handoff from one LTE cell that allows pre-registration to another that does not allow pre-registration, handoff from one LTE cell that does not allow pre-registration to another that allows pre-registration, and Handoff from one LTE cell that allows pre-registration to another that does not allow pre-registration, and then to eHRPD.

In certain aspects, when the UE is moving within LTE coverage, the UE may not have eHRPD overhead information, therefore, it may have to rely on one or more LTE parameters, like the pre-registration zone ID (which may be similar to or the same as color code), to determine how to handle an existing EVDO session. The eHRPD overhead information typically includes signaling that the network/base station provides to the UE. The signaling typically includes a subnet mask and sector ID, which may be used to calculate a unique subnet ID that uniquely identifies a subnet and that may be used by the network for the UE to transfer context from a source eAN to a target eAN. Similar to the subnet ID, the zone IDs/color codes may also be used to identify subnets. However, the zone IDs/color codes are not unique across the network and may be re-used to identify multiple subnets. Thus, the zone IDs/color codes may not always identify a correct subnet.

In some cases, the pre-registration zone ID/color codes and subnet IDs are not 1:1 mapped. Thus, if the UE performs UATI (Unicast Access Terminal Identifier) update procedure instead of restoring a Data Optimized (DO) session, the network may not recognize the UE/AT and the current DO session may be closed by the network which will cause data service interruption.

In certain aspects, if the UE performs the UATI procedure instead of restoring a DO session, the network may retrieve the session based on the color code provided by the UE through the UATI update procedure. Since the color code is not unique across eHRPD network, the network may retrieve a wrong session for the UE.

In certain aspects, the UE may remain without its tunnel mode activated while in an LTE cell that allows pre-registration. For example, the UE may retain the current session when it should open a new session that supports tunnel mode operation or the UE may do nothing when it should restore session as a way to activate the tunnel.

In certain aspects, the UE may undertake unnecessary radio signaling for EVDO session negotiation and/or UATI update procedure. For example, the UE may perform UATI update when it does not have to do anything.

Therefore, there is a need to define how the UE handles an EVDO session in different mobility scenarios.

In certain aspects, the UE needs to determine whether or not to perform an EVDO session related procedure, and which procedure to perform based on the particular mobility scenario (e.g., source/target RAT, whether an LTE cell allows pre-registration, and color code/subnet change detection). In certain aspects, UEs may need to determine performing one or more of a set of various operations, such as: discarding a current EVDO radio session (e.g., that does not allow S101 tunneling) and opening a new one (e.g., that allows S101 tunneling, trying to restore an EVDO radio session, performing UATI update procedure, or doing nothing.

FIG. 6A illustrates a table 600A showing example EVDO session handling when moving to or within E-UTRAN in accordance with certain aspects of the present disclosure. In certain example scenarios, the UE may have a DO session which has not timed out. Each index 602 denotes a mobility scenario. Column 604 denotes a RAT of a source cell the UE transfers from, e.g., LTE or eHRPD. If the RAT associated with the source cell 604 is LTE, the corresponding source cell field also shows whether or not it supports pre-registration. Column 606 denotes an LTE target cell the UE transfers into. Each field in the target cell column 606 also provides information regarding whether or not the LTE cell supports pre-registration (e.g. via S101 tunneling interface). Reference numeral 608, denotes an idle mobility scenario and provides information on available idle mobility procedures including cell reselection, cell redirection, out-of-service (OOS) procedures, and other information including Buffer Status Report (BSR). Reference numeral 610 denotes UE behavior based on the source cell 604, the target cell 606 and the idle mobility scenario 608.

Index 1 discusses a scenario when the UE moves from an LTE cell which supports pre-registration to another LTE cell which also supports pre-registration. In this scenario, the UE may perform a UATI procedure if a UATI color code of the source cell is different from a color code of the target cell. If not, the UE may retain a current session. Additionally or alternatively, the UE may perform a UATI procedure based on a secondary color code. The UATI color code is typically assigned by the eAN through a UATI assignment message. In tunnel mode, the UATI color code is typically used by the UE to determine if it is entering a new subnet. The UE typically compares the UATI color code with the pre registration zone id (should be same color as color code of eAN) broadcasted by the eAN, and determines that it has entered a new subnet if the UATI color code and the pre registration zone id are different. In an aspect, the eAN may optionally advertise a secondary pre registration zone id (should be same as the secondary color code of the eAN) to inform the UE that even if its UATI color code is different than color code of the eAN, the UE may still consider that it is entering the same subnet if assigned UATI color code is listed in the secondary color code list.

Index 2 discusses a scenario when the UE moves from an LTE cell which does not support pre-registration to another LTE cell which supports pre-registration. In this scenario, assuming an existing DO connection (e.g., the UE moved into the source cell from an LTE cell that allows pre-registration), the UE may try to restore the DO session. In an aspect, the source cell may also be an out of service cell.

Index 3 discusses a scenario when the UE transitions from a non-connected state to a connected state within a same LTE cell (e.g., when moving or transferring from a first portion of the cell to a second portion of the cell). In this scenario, the UE again may try to restore the DO session. For example, when a UE attempts to make a data call and transitions to an RRC_CONNECTED state, it may receive data indicating that the LTE cell actually does allow eHRPD pre-registration. Consequently, the UE may try to restore the DO session.

Index 4 discusses a scenario when the UE moves from any cell to an LTE cell which does not allow pre-registration. In this scenario, the UE may do nothing.

FIG. 6B illustrates a table 600B that shows EVDO session handling when moving from eHRPD to LTE with pre-registration allowed.

Index 1 discusses a scenario when the UE moves from an eHRPD cell to an LTE cell that supports pre-registration. In this scenario, the UE may restore a DO session if a protocol subtype (e.g., a Signaling Adaptation Protocol (SAP) subtype) in an active personality is non-zero. That is, when the UE has already negotiated parameters with the network including the protocols, the UE may restore a data optimized (DO) session. If not (if subtype is zero), the UE may discard the current session, create a new session with inter-RAT (IRAT) protocol subtypes, and perform pre-registration. In an aspect, during EV-DO session negotiation, the UE and the network need to negotiate protocol types and a subtype for each protocol. In order to operate in S101 signaling interface, appropriate subtype of individual protocols needs to be negotiated. The IRAT protocol subtypes are the protocol subtypes needed for S101 operation. For example, subtype 1 of the SAP protocol is one of the IRAT subtypes.

Index 2 discusses an alternative UE behavior when moving from eHRPD to LTE with pre-registration allowed. In the alternative aspect of index 2, when the idle mobility scenario includes cell reselection and the UE successfully reselects the target LTE cell from eHRPD, the UE behavior may include performing a UATI procedure (instead of restoring session as shown in Index 1) if the SAP subtype in the active personality is non-zero. If not, the UE may discard the current session, create a new session with IRAT protocol subtypes, and perform pre-registration.

FIG. 7 illustrates a table 700 showing example EVDO session handling during E-UTRAN to eHRPD mobility in accordance with certain aspects of the present disclosure. In certain example scenarios, the UE may have a DO session which has not timed out. Each index 702 represents a mobility scenario. Reference numeral 704 denotes a source RAT the UE transfers from, e.g., an LTE source cell, and whether or not the source cell supports pre-registration. Reference numeral 706 denotes a target eHRPD cell the UE transfers into. Reference numeral 708, denotes idle mobility scenario and reference numeral 710 denotes UE behavior based on the source cell 702, the target cell 706 and the idle mobility scenario 708.

Index 1 discusses a scenario when the UE moves from an LTE cell which supports pre-registration to an eHRPD cell. In this scenario, the UE may perform a UATI procedure if a subnet change is detected (e.g. subnet ID of the source is different from that of the target) and the UATI color code of the source is different from the secondary color code list (if available) of the target. In this case, the UE has the subnet ID of the source and has access to and acquires the subnet ID of the target and compares them to determine if there is a subnet change.

For example, when the subnet ID=123 and color code=Blue for the source cell and the subnet ID=234 and secondary color code list={Red, Green} for the target cell, the UE may decide to perform the UATI procedure.

As another example, when the subnet ID=123 and color code=Blue for the source cell and the subnet ID=123 and secondary color code list={Red, Green} for the target cell, the UE may retain the current session.

As a further example, when the subnet ID=123 and color code=Red for the source cell and the subnet ID=234 and secondary color code list={Red, Green} for the target cell, the UE may retain the current session.

In certain aspects, if the UE does not detect a subnet change, it may retain the current session.

Index 2 discusses a scenario when the UE moves from an LTE cell which does not support pre-registration to an eHRPD cell. In this scenario, the UE may try to restore the DO session if a subnet change is detected. In this case, since the UE does not have a way to know how far it has traveled and since color codes are not as reliable as the subnet ids (since they are re-used), the UE may decide not to perform the UATI procedure and risk closing the session. In certain aspects, if the UE does not detect a subnet change, it may retain the current session.

Index 3 discusses a scenario when the UE moves from a non-eHRPD RAT (tunnel mode is not enabled) to an eHRPD cell. As in the previous case, the UE may try to restore the DO session if a subnet change is detected. Otherwise, the UE may retain the current session.

In certain aspects, the operations presented herein regarding UE behavior for the different mobility scenarios may lead to the various advantages. For example, the operations may help reduce the chance of a session closed by the network, and thus, avoid service interruption and data loss, prevent a network from retrieving a wrong session, prevent the UE from remaining without tunnel mode activated while in an LTE cell which allows pre-registration, and reduce unnecessary radio signaling for EVDO session negotiation and/or UATI update procedure.

Figure 8:
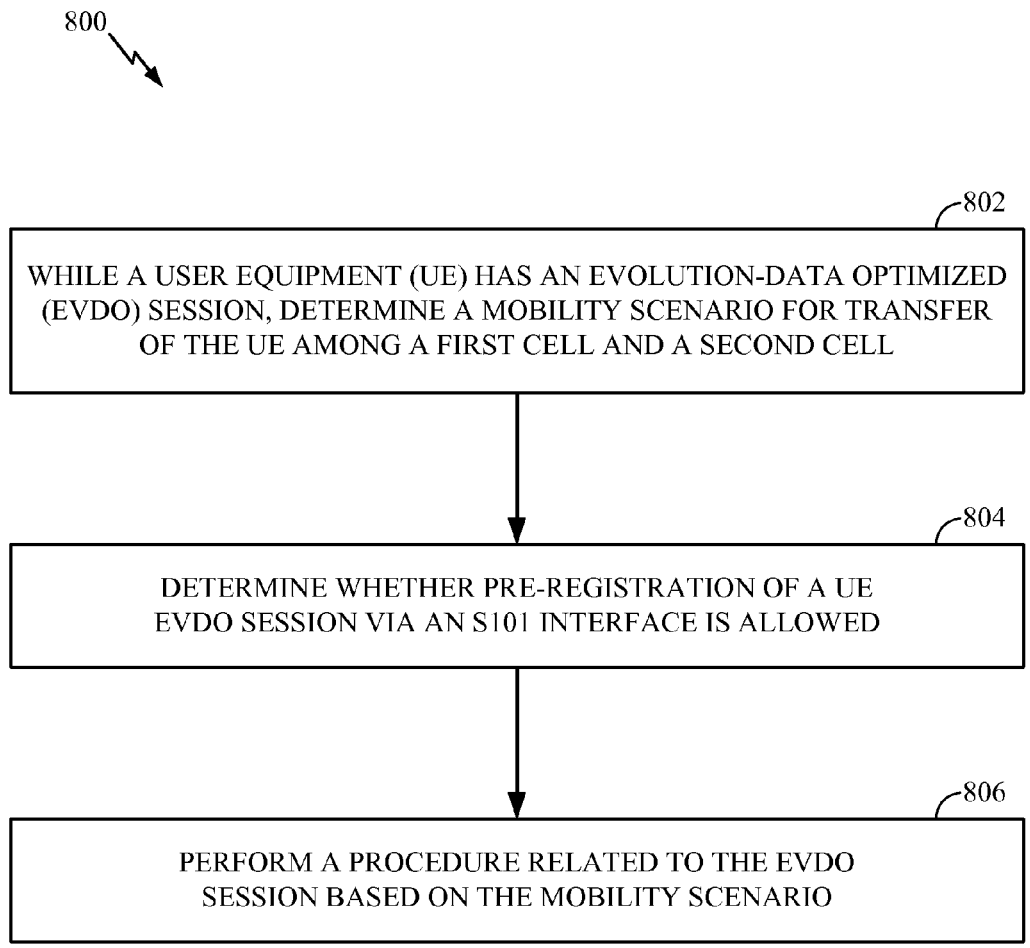
FIG. 8 illustrates example operations by a User Equipment (UE) for performing session handling during UE mobility, in accordance with certain aspects of the present disclosure.

FIG. 8 illustrates example operations 800 by a UE for performing session handling during UE mobility (e.g., an inter cell UE transfer) in accordance with certain aspects of the present disclosure. The operations 800 may begin, at 802, by, while a user equipment (UE) has an Evolution-Data Optimized (EVDO) session, determining a mobility scenario for transfer of the UE among a first cell and a second cell. At 804, it is determined whether pre-registration of a UE EVDO session via an S101 interface is allowed. At 806, a procedure related to the EVDO session is performed based on the mobility scenario.

The various operations of methods described above may be performed by any suitable means capable of and configured to perform the corresponding functions. The means may include various hardware and/or software component(s) and/or module(s), including, but not limited to a circuit, an application specific integrate circuit (ASIC), or processor. Generally, where there are operations illustrated in Figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits and algorithm steps described in connection with the disclosure herein may be implemented as electronic hardware, computer software, or combinations of both. To clearly illustrate this interchangeability of hardware and software, various illustrative components, blocks, modules, circuits and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components or any combination thereof designed to perform the functions described herein. A general-purpose processor may be a microprocessor, but in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM or any other form of storage medium known in the art. An exemplary storage medium is coupled to the processor such that the processor can read information from, and/or write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal Generally, where there are operations illustrated in Figures, those operations may have corresponding counterpart means-plus-function components with similar numbering.

In one or more exemplary designs, the functions described may be implemented in hardware, software, firmware or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for wireless communications, comprising:
   determining, while a user equipment (UE) has an Evolution-Data Optimized (EVDO) session, a mobility scenario for transfer of the UE among a first cell and a second cell, wherein the first and the second cells are associated with a same radio access technology (RAT), and wherein determining the mobility scenario comprises:
      determining that the transfer of the UE has taken place between the first cell and the second cell;
      determining whether pre-registration of a UE EVDO session via an S101 signaling interface is allowed; and
      performing a procedure related to the EVDO session based on the determined mobility scenario and whether the pre-registration is allowed or not, wherein performing the procedure related to the EVDO session based on the mobility scenario comprises:
         when the UE transfers from the first cell to the second cell, restoring a data optimized (DO) session.

2. The method of claim 1, wherein the RAT comprises long term evolution (LTE).

3. The method of claim 1, wherein determining whether pre-registration of a UE EVDO session is allowed includes:
   determining that the first cell does not allow pre-registration of a UE EVDO session associated with a second RAT via a signaling interface; and
   determining that the second cell allows pre-registration.

4. The method of claim 1, wherein determining whether pre-registration of a UE EVDO session is allowed includes determining that both the first and the second cells allow pre-registration of a session associated with a second RAT via a signaling interface.

5. The method of claim 4, wherein performing the procedure related to the EVDO session based on the mobility scenario comprises:
   when the UE transfers between a first cell and the second cell, performing a Unicast Access Terminal Identifier (UATI) procedure if a UATI color code of the first cell is different from a color code of the second cell and the UATI color code is different from all color codes listed in a secondary color code list of the second cell if the secondary color code list of the second cell is available; and
   when the UE transfers between a first cell and the second cell, retaining a current session if the UATI color code of the first cell is same as the UATI color code of the second cell or the UATI color code is same as one color code listed in a secondary color code list of the second cell if the secondary color code list of the second cell is available.

6. An apparatus for wireless communications, comprising:
   means for determining, while a user equipment (UE) has an Evolution-Data Optimized (EVDO) session, a mobility scenario for transfer of the UE among a first cell and a second cell, wherein the first and the second cells are associated with a same radio access technology (RAT), wherein the mobility scenario comprises a transfer of the UE between the first cell and the second cell;
   means for determining whether pre-registration of a UE EVDO session via an S101 signaling interface is allowed; and
   means for performing a procedure related to the EVDO session based on the determined mobility scenario and whether the pre-registration is allowed or not, wherein the procedure comprises restoration of a data optimized (DO) session when the UE transfers from the first cell to the second cell.

7. The apparatus of claim 6, wherein the RAT comprises long term evolution (LTE).

8. The apparatus of claim 6, wherein the means for determining whether pre-registration of a UE EVDO session is allowed is configured to:
   determine that the first cell does not allow pre-registration of a UE EVDO session associated with a second RAT via a signaling interface; and
   determine that the second cell allows pre-registration.

9. The apparatus of claim 6, wherein the means for determining whether pre-registration of a UE EVDO session is allowed is configured to:
   determine that both the first and the second cells allow pre-registration of a session associated with a second RAT via a signaling interface.

10. The apparatus of claim 9, wherein the means for performing the procedure related to the EVDO session based on the mobility scenario is configured to:
    when the UE transfers between a first cell and the second cell, perform a Unicast Access Terminal Identifier (UATI) procedure if a UATI color code of the first cell is different from a color code of the second cell and the UATI color code is different from all color codes listed in a secondary color code list of the second cell if the secondary color code list of the second cell is available; and
    when the UE transfers between a first cell and the second cell, retain a current session if the UATI color code of the first cell is same as the UATI color code of the second cell or the UATI color code is same as one color code listed in a secondary color code list of the second cell if the secondary color code list of the second cell is available.

11. An apparatus for wireless communication, comprising:
    at least one processor configured to:
       determine, while a user equipment (UE) has an Evolution-Data Optimized (EVDO) session, a mobility scenario for transfer of the UE among a first cell and a second cell, wherein the first and the second cells are associated with a same radio access technology (RAT), and wherein determining the mobility scenario comprises:
  determining that the transfer of the UE has taken place between the first cell and the second cell;
determine whether pre-registration of a UE EVDO session via an S101 signaling interface is allowed; and
perform a procedure related to the EVDO session based on the determined mobility scenario and whether the pre-registration is allowed or not, wherein performing the procedure related to the EVDO session based on the mobility scenario comprises:
  when the UE transfers from the first cell to the second cell, restoring a data optimized (DO) session; and
a memory coupled to the at least one processor.

12. A non-transitory computer-readable medium having computer-executable code stored thereon, the computer executable code comprising:

code for determining, while a user equipment (UE) has an Evolution-Data Optimized (EVDO) session, a mobility scenario for transfer of the UE among a first cell and a second cell, wherein the first and the second cells are associated with a same radio access technology (RAT), and wherein code for determining the mobility scenario comprises:

code for determining that the transfer of the UE has taken place between the first cell and the second cell;

code for determining whether pre-registration of a UE EVDO session via an S101 signaling interface is allowed; and code for performing a procedure related to the EVDO session based on the determined mobility scenario and whether the pre-registration is allowed or not, wherein code for performing the procedure related to the EVDO session based on the mobility scenario comprises:

code for when the UE transfers from the first cell to the second cell, restoring a data optimized (DO) session.

* * * * *